United States Patent

[11] 3,599,011

[72] Inventor Donald R. Zwolle
Saint Paul, Minn.

[21] Appl. No. 842,196
[22] Filed July 16, 1969
[45] Patented Aug. 10, 1971
[73] Assignee The United States of America as represented by the Secretary of the Navy

[54] DELAY LINE CLOCK
6 Claims, 3 Drawing Figs.

[52] U.S. Cl. .......... 307/223, 307/208, 307/269, 328/43, 328/55, 328/56, 328/105, 328/155
[51] Int. Cl. .......... H03k 2/00
[50] Field of Search .......... 307/208, 223, 269; 328/62, 63, 42, 43, 55, 56, 105, 106, 155

[56] References Cited

UNITED STATES PATENTS

| | | | |
|---|---|---|---|
| 3,005,960 | 10/1961 | Levenson | 328/56 X |
| 3,243,728 | 3/1966 | Brainerd et al. | 307/223 X |
| 3,343,169 | 9/1967 | Maine | 328/55 X |
| 3,521,143 | 7/1970 | Anderson et al. | 307/223 X |

*Primary Examiner*—Donald D. Forrer
*Assistant Examiner*—R. C. Woodbridge
*Attorneys*—Joseph C. Warfield, John W. Pease and Harvey A. David

ABSTRACT: A delay line clock having a plurality of interconnected delay line sections including control logic means whereby the sections can be operated sequentially with or without stops therebetween, and can be individually cycled. Special OR circuitry is used to limit the load of a plurality of taps from which clock phase outputs are derived.

PATENTED AUG 10 1971 3,599,011

SHEET 1 OF 3

Donald R. Zwolle
INVENTOR.

BY Harvey A. David
John M. [signature]
Attorneys

Donald R. Zwolle
INVENTOR.
BY Harvey A. David
John M. Pearson
Attorneys

Donald R. Zwolle
INVENTOR.
BY Harvey A. David
John M. Pierce
Attorneys

DELAY LINE CLOCK

BACKGROUND OF THE INVENTION

This invention relates to an improved delay line clock which is useful, for example, for timing of the arithmetic, control, and I/O sections of a computer system. Previous to this invention, delay line tapoff arrangements produced problems of loading in terms of over-shoot and ringing (reflection) back and forth along the delay line. Although it would be possible to place individual emitter-follower amplifiers at the taps to increase load impedance, the resultant desired load impedance would require the use of additional hardware to perform the OR functions normally associated with the taps.

SUMMARY OF THE INVENTION

With the foregoing in mind, it is a primary object of this invention to provide an improved delay line clock of the type comprising one or more individual delay lines, each having a plurality of taps for deriving clock phase or timing signals from the passage of a pulse along the delay line.

Another object of this invention is the provision of an improved delay line clock comprising novel OR gate circuitry for providing clock phase outputs with limited loading of the delay line element.

Yet another object of the invention is the provision of a delay line clock having a plurality of interconnected delay line sections together with control logic means whereby the delay line sections can be operated sequentially or can be independently recycled.

DESCRIPTION OF THE DRAWINGS

The invention may be further said to reside in certain combinations and arrangements of parts by which the foregoing objects and advantages are achieved, as well as others which will become apparent from the following detailed description when read in conjunction with the accompanying sheets of drawings forming a part of this specification, and in which.

DESCRIPTION OF THE PREFERRED EMBODIMENT

Figure 1:
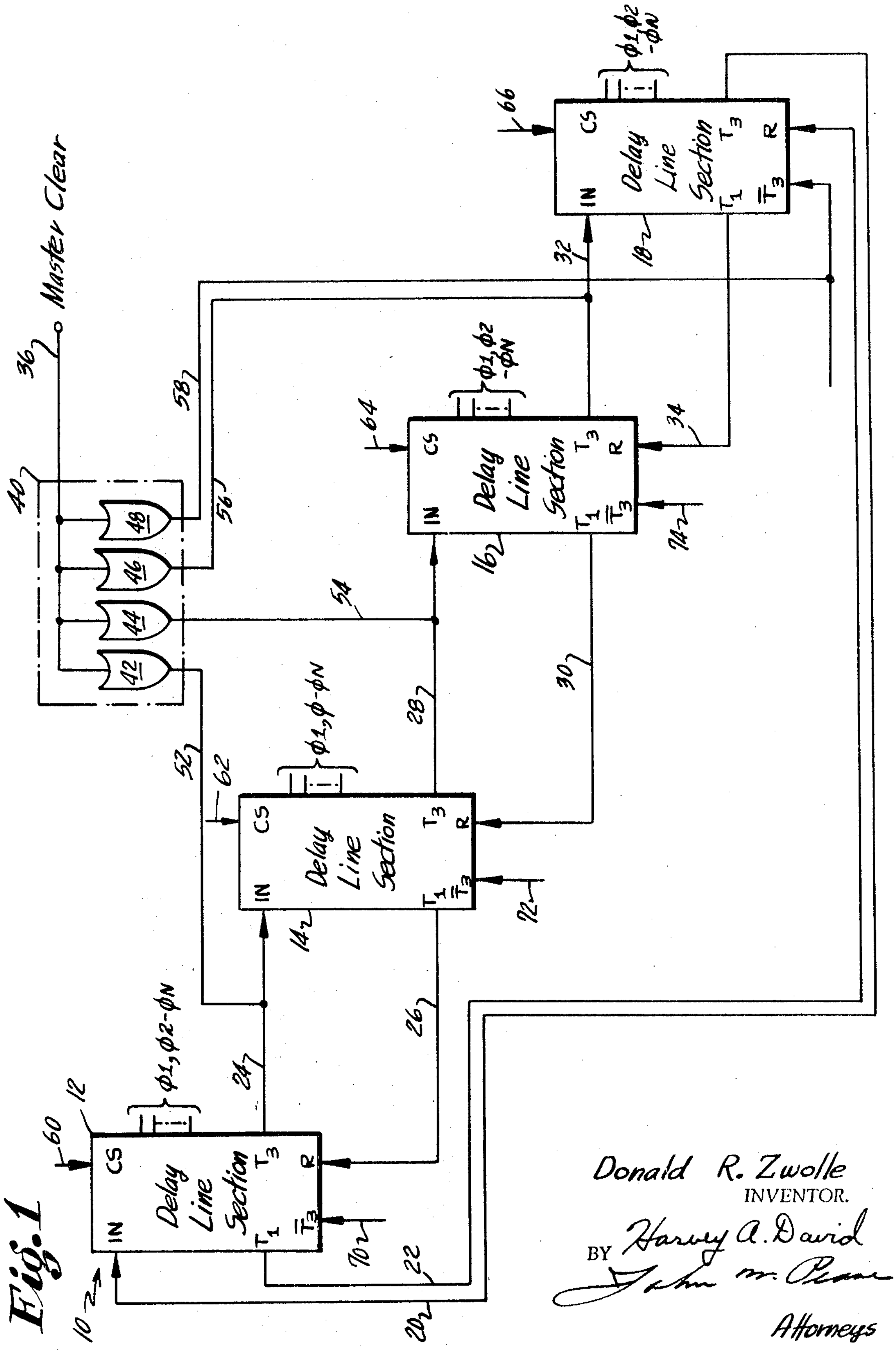
FIG. 1 is a diagrammatic illustration, in block form, of a delay line clock embodying the present invention.

In the form of the invention illustrated in the drawings and described hereinafter, there is provided a delay line clock, generally indicated at 10 in FIG. 1, which finds application in the timing of different sections of a computer, such as the arithmetic, control, and I/O sections. The invention provides "stop" or "hold" points in the clock cycle which allow one computer section to become synchronized with another, the clock 10 thereby accommodating the different operational speeds among the computer sections.

In the present example, one complete cycle of the clock 10 requires 1000 nsec. (nanoseconds), and provides stop points every 250 nsec. To this end, the clock 10 is divided into four delay line sections 12, 14, 16, and 18 of 250 nsec. each. Additionally, and as will be more fully described as the specification proceeds, the delay line sections provide clock phase signal outputs $\phi 1, \phi 2 ... \phi N$ at selected intervals within the 250 nsec. period, for example every 10 nsec.

Operation of the delay line sections may be accomplished according to this invention either in sequential fashion or by selective recycling of one or more of the delay line sections. This is accomplished through interconnection of the delay line sections and by application of certain control signals. Each of the delay line sections 12—18 is characterized by operational signals or voltage levels which are applied to or received from preceding or succeeding ones of the delay line sections to provide conditioning and timing functions. The sections also are conditioned by receiving externally provided clearing signals and control signals. Connections for the various signals or levels are represented for each delay line section as IN; CS; $T_1$, $T_3$; $\overline{T}_3$; and R, the purposes of which will become apparent as this specification proceeds.

The delay line sections are interconnected by suitable conductors as indicated by flow lines in FIG. 1. Thus, the IN connection of delay line section 12 is connected by line 20 to the $T_3$ connection of section 18, $T_1$ of section 12 is connected by line 22 to R of section 18, $T_3$ of section 12 is connected by line 24 to IN of section 14, and R of section 12 is connected by line 26 to $T_1$ of section 14. The $T_3$ connection of section 14 is connected by line 28 to IN of section 16, R of section 14 is connected by line 30 to $T_1$ of section 16, while $T_3$ and R of section 16 are connected respectively to IN and $T_1$ of section 18 by lines 32 and 34.

The clock 10 is cleared for initial operation, in a manner later described in more detail, by application of a master clear signal to a line 36 as an input to inverter means 40. The inverter means 40 comprises four signal inverters 42, 44, 46 and 48 connected respectively by lines 52, 54, 56, and 58 to lines 24, 28, 32, and to $\overline{T}_3$ of section 18. As will be explained hereinafter, additional control signals are applicable to the CS connections of the delay line sections 12—18 as shown by lines 60, 62, 64, and 66. Similarly, inputs may be applied to the $\overline{T}_3$ connections of sections 12, 14, and 16 as shown by lines 70, 72, and 74.

Figure 2:
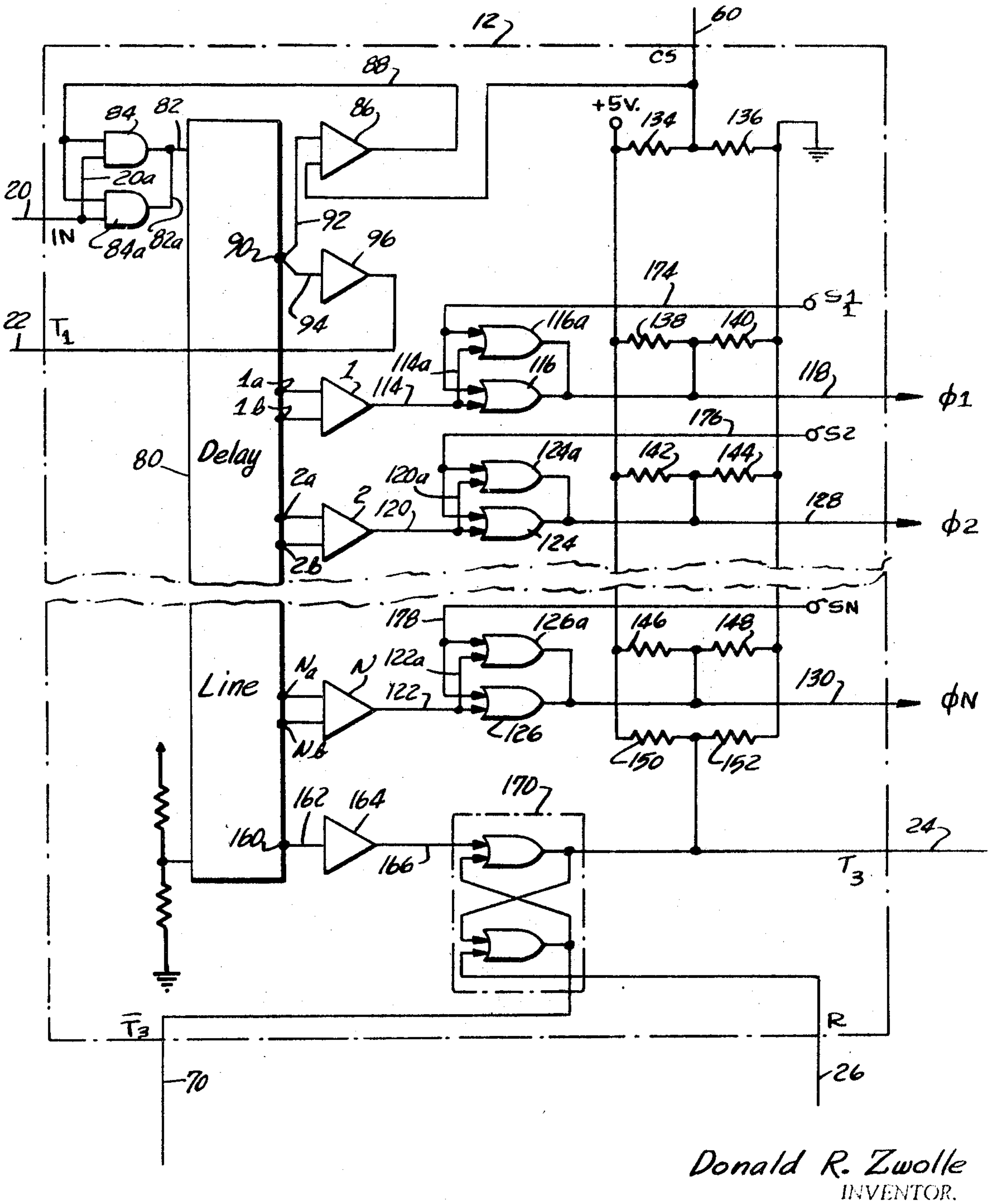
FIG. 2 is a diagrammatic illustration, in more detail, of one delay line section forming part of the clock of FIG. 1.

Each of the delay line sections 12—18 are substantially alike, accordingly the following description of section 12 will be understood to be applicable as well to the other sections. Referring to FIG. 2, the section 12 comprises a delay line element 80 to which an input signal may be applied at one end via lines 82, 82*a* from NAND gates 84, 84*a*, which are responsive in part to an input via lines 20 and 20*a*. The NAND gates 84, 84*a* are also responsive to the output condition of a gate 86 via line 88. The gate 86 is responsive to a control signal applied via line 60 and to a pulse passing a tap 90 of the delay element 80. the tap 90 being connected via line 92 to the gate 86. The tap 90 is also connected via line 94 to a gate 96, the output condition of which is found on line 22, the $T_1$ connection for a purpose which will presently be made apparent.

Figure 3:
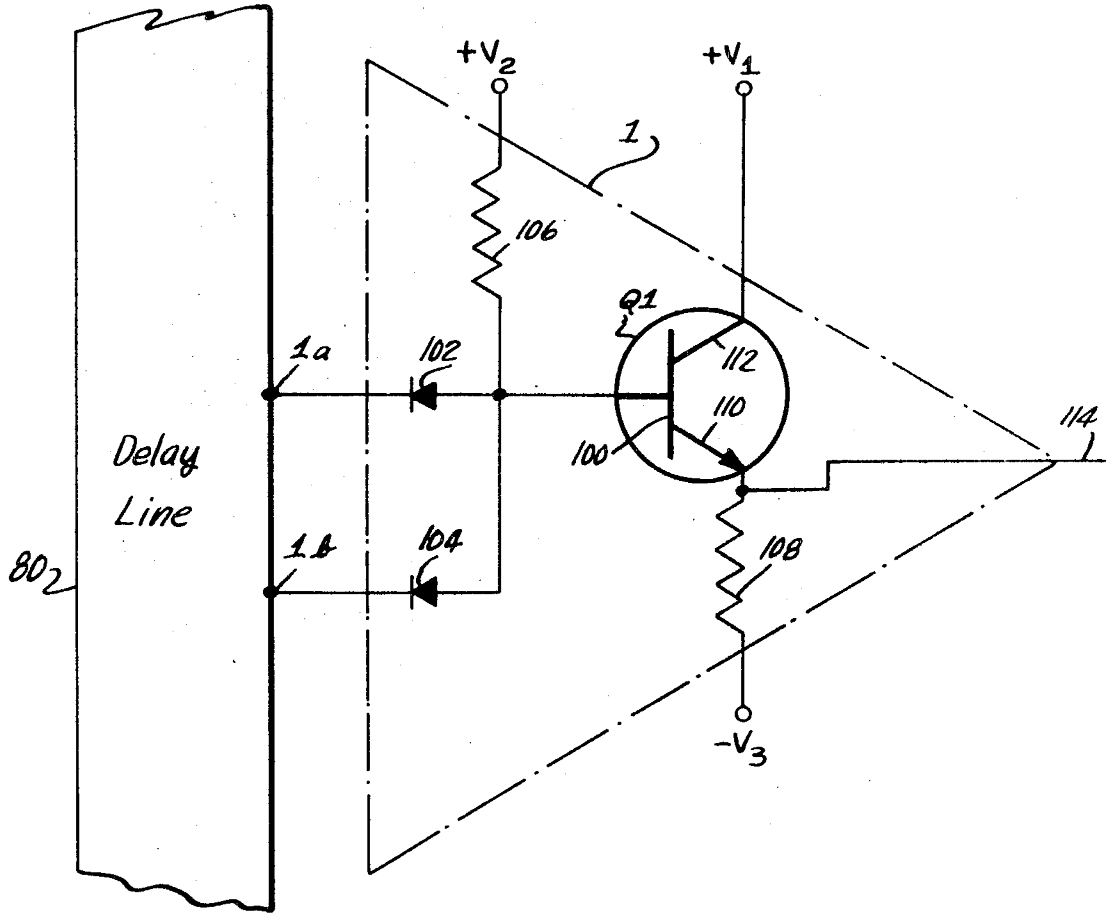
FIG. 3 is a schematic illustration of a special circuit forming part of the delay line section of FIG. 2.

The delay line element 80 is provided with a plurality of taps 1*a*, 1*b*; *2a*, *2b*; N*a*; N*b* at selected intervals therealong, these taps serving a plurality of special circuits 1, 2, N. A representative one of these special circuits, namely circuit 1, is illustrated in FIG. 3 to which reference is now made. The circuit 1 comprises a transistor Q1 having its base 100 connected through diodes 102 and 104 to taps 1*a* and 1*b*, respectively. The transistor Q1 is normally biased through base resistor 106 and emitter resistor 108 from suitable voltage supplies to render the transistor normally conducting when the voltage of the delay line element is high, its normal condition. In this condition the emitter 110 will be at a high voltage condition, approaching the voltage $V_1$ of the collector 112 or the voltage of the delay line element 80 if $V_1$ is sufficiently large. The voltage of the emitter 110 is taken as the output of the circuit 1 via line 114.

Assuming, for example, that the delay line element 80 goes low (e.g. about 0.3 volt) at tap 1*a* for a pulse width of 80 nsec., the diode 102 will drain the excess base current of Q1 into the delay line element (which has a characteristic resistance value of about 100 ohms). Therefore, the emitter 110 and output line 114 will follow the voltage of the delay line element. As the pulse propagates down the element 80 to tap 1*b*, the diode 104 will perform the same function. Accordingly, the voltage on line 114 will be low from the time the delay line element 80 goes low at tap 1*a* until the element 80 goes high at tap 1*b*, assuming the pulse width is greater than the spacing of taps 1*a* and 1*b*. The circuits 1, 2, N derive outputs from the delay line element 80 without adding any appreciable load thereto, the amount being controlled by fixing the current through resistor 106. It should also be noted that diodes 102, 104 and the base/emitter junction of Q1 perform temperature compensation of the voltages between the cathodes of the diodes and the emitter of Q1.

Reverting to FIG. 2, the output of circuit 1 is applied as an input via lines 114, 114a to a pair of parallel connected OR gates 116, 116a. The output of these OR gates is found on line 118 and constitutes the clock signal $\phi 1$. The signal $\phi 1$ is, in one practical embodiment utilizing the invention, fanned out to a plurality of computer points, say 11 in number, and that is the purpose of pairing of gates 116, 116a. Obviously, if some lesser number of applications of the gate outputs were needed, the gate 116a might well be omitted.

The outputs of circuits 2 and N, as well as others therebetween, are similarly applied as by lines 120, 120a, and 122, 122a, respectively, to OR gates 124, 124a and 126, 126a. The outputs of gates 124, 124a appear on line 128 as clock signal $\phi 2$, and the outputs of gates 126, 126a appear on line 130 as $\phi N$.

A pullup resistor network comprising resistors 134, 136, 138, 140, 142, 144, 146, 148, 150, and 152 is provided for applying suitable voltages to lines 60, 118, 128, 130, and 24.

At the terminal end of the delay line element 80 is provided a tap 160 connected by line 162 to an OR gate 164, the output of which on line 166 is normally in a high state. This output line 166 is connected as one input to a flip-flop 170. Another input thereto may be applied by the R or reset line 26. The flip-flop 170 provides a $T_3$ output in one condition via line 24. Additionally a signal may be applied to the $\overline{T}_3$ connection to effect change of condition of the flip-flop.

Operation of the clock 10 will best be understood by going through an exemplary cycle starting with clearing of all the delay line sections 12—18 with a high level master clear signal applied to line 36. The inverters 42, 44, 46, and 48 invert the master clear signal so that the outputs from each of these inverters is a low level signal during the clearing operation. Hence, the input signal on each of lines 24, 28, and 32 to delay line sections 14, 16, and 18 is low. Note that line 58 from the master clear inverter 48 goes to the $\overline{T}_3$ connection of section 18. Therefore, the signal level output on $T_3$ line 20 from delay line section 18 is high (logical not of $\overline{T}_3$). This automatically causes the INPUT signal level to section 12, and only section 12, to be high. In other words, after master clearing, a cycle can only be started with delay line section 12 because only it has a high level signal on its IN lead.

Beginning then with section 12, there is a low level signal on the CS (control signal) lead 60 thereof, which signal is derived from a computer being served by the clock 10. This must be so during the master clearing operation otherwise the clock would begin running immediately when the IN lead to section 12 went high. Next, a high control pulse is applied to the CS lead 60. Note that the delay line element 80 is still sitting in its high level condition (the static condition is high). The high control pulse on line 60 combined with the high condition on line 92 from tap 90 causes a high level output on line 88 from gate 86. This high level signal output, when applied to gates 84, 84a in combination with the high level IN signal on line 20, causes the output from gates 84, 84a on line 82 to go low. This low signal tends to hold the delay line element low as the pulse begins to propagate down the delay line element. As this low signal proceeds down, it arrives at tap 90 to gates 86 and 96. Remember that the control signal on line 60 stays high during this time to maintain the delay line element 80 low. If the control signal were terminated, the cycle would automatically stop and/or preshorten the pulse width.

When the low level signal, tapped at 90 which is for example the 80 nsec. point, is applied to gate 86, that gate provides on line 88 a low level output which is applied to gates 84, 84a. This produces a high level output from gates 84, 84a which places the upper end of the delay line element in the high condition, thereby determining the width of the low level pulse being propogated along the delay line element. Meanwhile, the low level pulse is propogating down the delay line element.

When the low level pulse is applied to gate 96, also after the mentioned 80 nsec., the $T_1$ output therefrom on line 22 becomes low as well. As shown in FIG. 1, the line 22 constitutes the R input to delay line section 18. This low R input to section 18 causes the $T_3$output on line 20 from section 18 to go low. Therefore, the input at IN of section 12 is cut off (goes low). Conversely, the $\overline{T}_3$connection of section 18 goes high at that time.

As the low level pulse propagates down the delay line element 80 of section 12 for a total in this example of 250 nsec., each of the clock phase outputs $\phi 1$, $\phi 2$...$\phi N$ are enabled. It should be noted that the gates 86, 96, 1, 2...N, and 164 are always in the high condition during static or nonoperative portions of a cycle. Therefore, prior to the time that the low wave pulse reaches OR gate 164, its output is high thus producing a low level signal $T_3$output on line 24. However, when the low level pulse reaches tap 160 for gate 164 after 250 nsec., gate 164 output goes low causing the $T_3$ output of flip-flop 170 to go high at that time. Since the $T_3$ output of delay line section 12 is applied via line 20 to the IN connection of delay line section 14, the latter is thereby readied to operate for the next 250 nsec. period. Moreover, since the IN signal to section 12 has already gone low, that section will be inoperative and will remain so until the next master clear and control signal or the operation of delay line section 18 which would cause the IN connection (line 20) of section 12 to go to a high level. Additionally, the delay line sections can be specifically recycled in a manner presently to be described. This condition is that in which a "stop" or "hold" may be effected prior to cycling of the following delay line section.

Next, the delay line section 14 is operated in exactly the same manner as was the section 12. The same is true, sequentially, for the sections 16 and 18. In each case, however, there must be a high level control pulse signal on the CS lead 60, 62, 64, or 68 to cause the respective delay line section to operate. The control logic of a computer with which the clock 10 is associated determines which of the delay line sections are to be made ready to go by applying the high level signal on the CS leads.

With respect to the mentioned recycling of a section, assume that it is necessary to operate a delay line section, for example section 14, more than once in succession. Functionally then, section 12 would have finished its cycle in 250 nsec. and section 14 would have finished in another 250 nsec. for its cycle. To operate section 14 an additional cycle, a low level signal is applied to the $\overline{T}_3$ lead 70 of section 12 in any suitable fashion causing the $T_3$ output of flip-flop 170 to go high. With the section 14 control signal present on line 62, section 14 will cycle once more and then terminate with $T_3$ thereof, on line 28, high, thereby initiating operation of section 16, assuming the presence of a control signal on line 64.

Each of the delay line sections 12—18 may be conveniently provided with terminals S1, S2...SN (FIG. 2) connected respectively as by lines 174, 176, and 178 to the gates 116 and 116a, 124 and 124a, and 126 and 126a. These terminals S1, S2...SN may serve as test points or alternatively to manually cycle through a phase, though the clock 10 be not running.

What I claim is:

1. A delay line clock comprising:

a plurality of delay line sections each having connections for receiving an input signal, a control signal and a reset signal, and having connections for providing a reset signal, an end of cycle signal, and N clock phase signals where N is an integer greater than one;

conductor means interconnecting said sections in series whereby an end of cycle signal, produced upon completion of a cycle of N clock phase signal outputs of a first one of said sections, will condition another of said sections for commencement of a cycle of N clock phase signal outputs upon receiving a control signal;

each of said delay line sections comprising a delay line element of predetermined length;

first gate means connected to receive said input signal from another of said delay line sections and to initiate propagation of a pulse from one end of said delay line element toward the other end thereof;

a plurality of taps disposed at predetermined intervals along said delay line element;

second gate means connected to a first of said taps and to said first gate means, said second gate means being responsive to presence of said pulse at said first tap to cause said first gate means to determine the width of said pulse;

third gate means connected to said first tap and responsive to presence of said pulse thereat to provide a reset signal to said other delay line section from which said input signal was received;

fourth gate means connected to second and third taps, said fourth gate means being responsive to said pulse passing said second and third taps to provide an output corresponding to the time period said pulse is at either or both of said second and third taps;

fifth gate means connected to fourth and fifth taps and responsive to said pulse passing one or both thereof to provide an output corresponding to the time of such passing;

sixth gate means connected to a sixth tap;

flip-flop means connected to said sixth gate means, said sixth gate means being responsive to said pulse at said sixth tap to cause said flip-flop to produce said cycle completed signal for application as the input signal to condition a subsequent delay line section.

2. A delay line clock as defined in claim 1, and:

each of said delay line sections further comprising an additional connection to said flip-flop means thereof whereby a recycle signal applied to said connection of the delay line section preceding one which has just completed a cycle will recondition said one for another cycle.

3. A delay line clock as defined in claim 1, and wherein said gate means each comprise:

first and second diodes each having a like side connected to a respective one of said taps;

a transistor having its base connection connected to the other side of each of said diodes;

base and emitter biasing resistors connecting said base and emitter to voltage sources and operative to maintain said transistor in a first conductive condition to provide a first output condition across the emitter resistor thereof in the absence of said pulse at either of said taps connected to said diodes; and said diodes being oriented to change the bias on said base in response to said pulse at either of said taps connected thereto so as to alter the conductive condition of said transistor and hence to provide a second output condition across said emitter resistor.

4. A delay line clock as defined in claim 2, and wherein said gate means each comprise:

first and second diodes each having a like side connected to a respective one of said taps;

a transistor having its base connection connected to the other side of each of said diodes;

base and emitter biasing resistors connecting said base and emitter to voltage sources and operative to maintain said transistor in a first conductive condition to provide a first output condition across the emitter resistor thereof in the absence of said pulse at either of said taps connected to said diodes; and said diodes being oriented to change the bias on said base in response to said pulse at either of said taps connected thereto so as to alter the conductive condition of said transistor and hence to provide a second output condition across said emitter resistor.

5. A delay line clock as defined in claim 1 and further comprising:

master clear means connected to each of said delay line sections for simultaneously clearing each of said delay line sections in response to a single master clear signal and conditioning one of said delay line sections for operation upon application of said control signal thereto.

6. A delay line clock as defined in claim 5, and wherein said master clear means comprises:

a plurality of inverter means, one for each of said delay line sections and each responsive to said master clear signal to provide an individual output signal to the respective delay line section;

one of said inverters being connected to apply its output signal to the delay line section preceding said one delay line section, and the others of said inverters being connected to apply their output signals to said input connections of the others of said delay line sections.